US006738455B1

(12) United States Patent
Miyagawa

(10) Patent No.: US 6,738,455 B1
(45) Date of Patent: May 18, 2004

(54) APPARATUS AND METHOD FOR TESTING SUBSCRIBER LINES AND EQUIPMENT

(75) Inventor: Takeshi Miyagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/469,762

(22) Filed: Dec. 22, 1999

(30) Foreign Application Priority Data

Feb. 23, 1999 (JP) .............................. 11-044011

(51) Int. Cl.$^7$ .......................... H04M 1/24; H04M 3/08; H04M 3/22
(52) U.S. Cl. ................. 379/27.01; 379/29.01; 379/27.02; 379/27.03
(58) Field of Search ................ 379/1.01, 1.03, 379/1.04, 9, 15.03, 22.02, 22.04, 24, 27.01, 29.01, 30, 32.04

(56) References Cited

U.S. PATENT DOCUMENTS

| 4,446,341 A | * | 5/1984 | Rubin |
| 4,663,775 A | * | 5/1987 | Olek |
| 5,361,293 A | * | 11/1994 | Czerwiec |
| 5,471,517 A | * | 11/1995 | Nakagawa |
| 5,764,726 A | * | 6/1998 | Selig et al. |
| 5,870,451 A | | 2/1999 | Winkler et al. |
| 5,937,033 A | * | 8/1999 | Bellows |

FOREIGN PATENT DOCUMENTS

| JP | 2-309837 | 12/1990 |
| JP | 9-130483 | 5/1997 |
| WO | 98/21869 | 5/1998 |
| WO | 98/44704 | 10/1998 |
| WO | 99/07129 | 2/1999 |

* cited by examiner

Primary Examiner—Duc Nguyen
(74) Attorney, Agent, or Firm—Katten Muchin Zavis Rosenman

(57) ABSTRACT

An apparatus and method for testing the connectivity of subscriber terminals more efficiently. A subscriber test controller controls a process of a subscriber test by sending related test parameters and identification data to identify a target subscriber to be tested. A subscriber data management unit collects subscriber data and centrally manages the collected subscriber data. A target subscriber determination unit identifies the target subscriber by using the identification data in searching the subscriber data. A subscriber test execution unit receives the test parameters through a transmission path routed separately from trunks interconnecting the telecommunications devices, and runs a subscriber test according to the received test parameters.

9 Claims, 13 Drawing Sheets

SUBSCRIBER DATA
CROSS-REFERENCE TABLE T

| PN | L3 Address | V5 interface ID | TID | AID |
|---|---|---|---|---|
| 7543729 | 0 | h'FFFFF9 | 1-FSX2000 | 1-2-4-4 |
| 7543730 | 1 | h'FFFFF9 | 1-FSX2000 | 1-2-4-5 |
| ---- | ---- | ---- | ---- | ---- |
| 7544029 | 299 | h'FFFFF9 | 1-FSX2000 | ---- |
| 7513888 | 0 | h'FFFFF8 | 2-FSX2000 | 2-2-4-4 |
| 7513889 | 1 | h'FFFFF8 | 2-FSX2000 | 2-2-4-5 |
| ---- | ---- | ---- | ---- | ---- |

121 / 122 / 123 / 124 / 125

FIRST SUBSCRIBER DATA STORED IN LOCAL EXCHANGE 20

SECOND SUBSCRIBER DATA STORED IN ACCESS NETWORK 30

FIG. 4

APPARATUS AND METHOD FOR TESTING SUBSCRIBER LINES AND EQUIPMENT

BACKGROUND OF THE INVENTION

1. Field of the Invention

The present invention relates to an apparatus and method for testing subscriber lines and equipment, and more particularly to an apparatus and method for testing subscribers lines and equipment being served by telecommunications devices that are linked by an interface.

2. Description of the Related Art

Today's network systems have increased in size and complexity to serve diverse user needs for telecommunications services. To achieve efficient operations and maintenance of transmission channels in such a circumstance, telecommunication carriers centrally manage maintenance information at their service centers, monitoring alarm signals from transmission equipment deployed over a wide coverage area, as well as receiving complaint calls from customers. If any failure is reported, they should conduct an appropriate test to locate each problem in a prompt and proper manner.

The ITU-T and ETSI, standardization organizations in this technical field, provide universal data communication interface standards known as V series recommendations. Among those recommendations, V5 interface standards define a set of requirements for digital communications between a local exchange (LE) and an access network (AN), where the term "access network" refers to a sub-network comprising a central terminal (CT) and remote terminals (RT) to allow individual subscribers to make access to a public switched network. V5 standards provide open interface specifications to enable multi-vendor solutions for telecommunications systems, where LE and AN equipment from different vendors can interoperate.

The V5 recommendations actually include two types of interface specifications: V5.1 and V5.2. FIG. 11 schematically shows a system model using the V5.1 interface. This system includes an access network (AN) 300 which comprises a central terminal (CT) 301 and a remote terminal (RT) 302 being interconnected by a fiber optic cable Lo. The access network 300 is connected to a local exchange (LE) 200 via a 2.048 Mbps digital trunk L1 that conforms to the V5.1 interface standards. In addition to analog telephone equipment, ISDN-BRA digital data terminals are coupled to the remote terminal 302. Here, "ISDN-BRA" refers to 2B+D basic rate access services of ISDN. The V5.1 interface supports only one 2.048 Mbps digital trunk L1, which permits, for example, 30 channels of 64 kbps digital telephone lines to be connected to the RT 302. Accordingly, two 2.048 Mbps links would be required to accommodate 60 channels.

In contrast to FIG. 11, FIG. 12 schematically shows a system model using the V5.2 interface. This system includes an access network (AN) 300, which comprises a central terminal (CT) 301 and a remote terminal (RT) 302 interconnected by a fiber optic cable Lo. The central terminal 301 is connected to a local exchange (LE) 200 via a 2.048 Mbps digital trunk L2 that conforms to the V5.2 interface standards. The remote terminal 302 serves analog telephone equipment and digital data terminals for ISDN-BRA and ISDN-PRA services. Note that "ISDN-PRA" stands for 23B+D or 24B/D primary rate access of ISDN.

Compared with the V5.1-based system of FIG. 11, this V5.2-based system has two major differences. First, a line concentrator 302a is incorporated in the RT 302. Second, it is possible to have two or more 2.048 kbps digital trunks to connect between the central terminal 301 and local exchange 200. (Actually, it has at least two trunks L2 for dual redundancy capabilities; one for active channels and the other for protection channels.)

Referring back to FIG. 11, suppose, for example, that the RT 302 has to handle 120 channels of 64 kbps digital terminals. This does not necessarily means that four 2.048 Mbps digital trunks L1 are required, since it is unlikely that all the available digital terminals use connection services at the same time. In reality, average traffic is expected to be much lower than the theoretical peak bandwidth that the remote terminal 302 may require to handle 120, 64 kbps channels. If the assessment of traffic does not necessitate the use of V5.1 interface, the V5.2 interface with line concentration capabilities would be the right choice, since it does not pre-assign the bearer channels to subscribers and thus provides more economical solutions.

While defining physical, electrical, and procedural requirements for digital interface, the V5 recommendations lack the specification of subscriber test methods. Suppose, for example, that a maintenance person stationed at the local exchange 200 is attempting to probe a particular subscriber terminal that is connected to the access network 300. The V5 digital link L1 or L2, however, does not allow him/her to send necessary test parameters to the terminal, because of the lack of specifications for testing telecommunications equipment over a V5 interface. Conventionally, he/she has to use two separate test stations to run a subscriber test, connecting one to the local exchange 200 and the other to the central terminal 301.

FIG. 13 shows a typical configuration of a conventional subscriber test system for V5 interface. In this system, two subscriber test stations 100 and 101 are coupled to a local exchange (LE) 200 and a central terminal (CT) 301, respectively. Besides terminating and switching circuits and trunks, the local exchange 200 directly serves its local subscriber terminals, which will be referred to herein as "LE-side subscribers." The first test station 100 is thus called the "LE-side subscriber test station."

On the other hand, the central terminal 301, as part of an access network (AN) 300, handles calls to/from subscriber terminals connected to a remote terminal (RT) 302 shown in the bottom of FIG. 13. Those terminals will be referred to herein as "AN-side subscribers," and the second test station 101 is thus called the "AN-side subscriber test station." The local exchange 200 and central terminal 301 are interconnected by a 2.048 Mbps digital trunk L that is compatible with the V5 interface specifications. The central terminal 301 is linked to a remote terminal 302 via a fiber optic cable Lo.

Being unable to use the V5 digital link L for testing purposes, as mentioned earlier, the conventional subscriber test system performs a test by using both the LE-side subscriber test station 100 and AN-side subscriber test station 101 simultaneously to probe an LE-side subscriber under test and an AN-side subscriber under test, respectively. One disadvantage of such a conventional subscriber test system is that the maintenance person has to use different test stations to manipulate both the LE-side and AN-side subscriber terminals. This work environment imposes heavier loads on the maintenance person and spoils the efficiency of his/her tasks. Another disadvantage is that the information regarding individual subscribers is not centrally managed, but distributed in separate databases in the local exchange 200 and access network 300. It is therefore difficult to ensure consistency between the two databases because they could be updated separately. Possible data inconsistency could cause inappropriate behavior of the test system, such as testing an incorrect target subscriber, resulting in degraded quality of customer services.

SUMMARY OF THE INVENTION

Taking the above into consideration, an object of the present invention is to provide a subscriber test apparatus which provides improved efficiency and quality in maintenance work.

To accomplish the above object, according to the present invention, there is provided an apparatus for conducting a subscriber test for subscribers connected to such telecommunications devices that are linked by an interface. This apparatus comprises: (a) a subscriber test controller which controls a process of a subscriber test by sending related test parameters and identification data to be used to identify a target subscriber to be tested, and (b) a subscriber data controller which controls data concerning the subscribers. The subscriber data controller comprises: (b1) a subscriber data management unit which collects subscriber data and centrally manages the collected subscriber data, and (b2) a target subscriber determination unit, responsive to the identification data sent from the subscriber test control unit, which identifies the target subscriber by using the received identification data in searching the subscriber data being managed by the subscriber data management unit. The apparatus reaches one of the telecommunications devices through a transmission path that is routed separately from links interconnecting the telecommunications devices. The apparatus further comprises (c) a subscriber test execution unit, disposed in the one of the telecommunications devices, which receives the test parameters through the transmission path and runs the subscriber test according to the received test parameters.

Another object of the present invention is to provide a subscriber test method which provides improved efficiency and quality in maintenance work.

To accomplish the above object, according to the present invention, there is provided a method of conducting a subscriber test for subscribers connected to such telecommunications devices that are linked by an interface. This method comprises the following steps: (a) collecting subscriber data and centrally managing the collected subscriber data; (b) sending identification data to identify a target subscriber to be tested; (c) identifying the target subscriber by using the received identification data in searching the subscriber data; (d) sending test parameters relating to the subscriber test through a transmission path that is routed separately from links interconnecting the telecommunications devices; and (e) running the subscriber test for the determined target subscriber, according to the received test parameters.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram which shows an example of subscriber data cross-reference table;

DESCRIPTION OF THE PREFERRED EMBODIMENTS

Preferred embodiments of the present invention will be described below with reference to the accompanying drawings.

Figure 1:
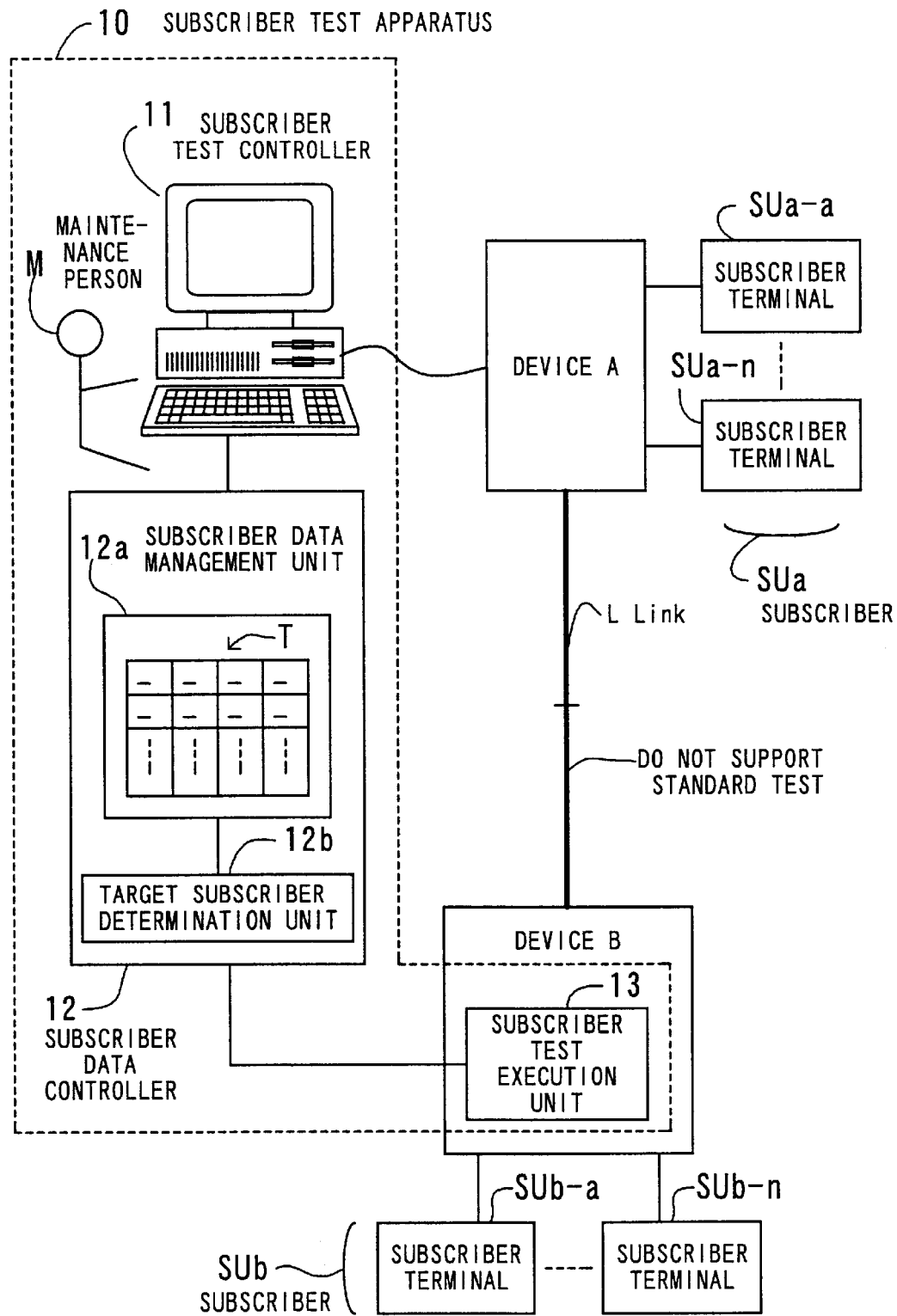
FIG. 1 is a conceptual view of a subscriber test apparatus according to the present invention.

FIG. 1 shows the concept of a subscriber test apparatus 10 according to the present invention. This subscriber test apparatus 10 verifies the connectivity of two groups of subscriber terminals, SUa and SUb, being served by two telecommunications devices A and B, respectively. The first subscriber group SUa includes member subscriber terminals SUa-a to SUa-n, while the second subscriber group SUb includes member subscriber terminals SUb-a to SUb-n. The first device A is connected to the second device B via a telecommunication link or trunk L, which provides a predefined interface e.g., V5 interfaces, but do not support standard test specifications.

The subscriber test controller 11 is a piece of data terminal equipment, such as a personal computer, which controls a process of subscriber tests. This controller 11 also serves as a station used by a maintenance person M to accept complaint calls from members of the subscriber groups SUa and SUb, and if required, it sends test parameters describing what kind of test should be conducted to solve the reported problems. When a test is planned, the subscriber test controller 11 supplies a subscriber data controller 12 with identification data relevant to a particular subscriber group or subscriber terminal(s) to be tested.

The subscriber data controller 12 comprises a subscriber data management unit 12a and a target subscriber determination unit 12b. The subscriber data management unit 12a collects subscriber data describing each member of the subscriber group SUa and SUb for centralized management.

The subscriber data actually consists of the following two kinds of information: first subscriber data stored in the device A, and second subscriber data stored in the device B. Collecting those first and second subscriber data, the subscriber data management unit 12a creates and manages a subscriber data cross-reference table T which cross-references the two data sets as will be described later.

Recall that, in conventional systems, each piece of remote telecommunication equipment, such as device A or B, separately manages relevant subscriber data in its own database. This makes it difficult to maintain the consistency between the two separate databases in a realtime manner, meaning that there must be some time delay before some updates occurred on one side are applied on the other side. As opposed to such conventional systems, the subscriber test apparatus 10 according to the present invention centrally manages local and remote subscriber data without delay, making it possible to improve the quality of maintenance activities. When updating the subscriber data, the subscriber data management unit 12a automatically adjust the cross-reference between the first subscriber data and second subscriber data. The details of those first and second subscriber data will be provided in a later section.

The target subscriber determination unit 12b determines a target subscriber to be tested, on the basis of the subscriber data cross-reference table T, receiving identification data from the subscriber test controller 11. It then notifies the subscriber test controller 11 which subscriber is determined as the target subscriber.

A subscriber test execution unit 13 is employed in the device B as shown in FIG. 1, assuming that the target subscriber is among the second subscriber group SUb. (A like unit should be disposed in the other device A, if required for testing the first subscriber group SUa.) To interact with the subscriber data controller 12, it has a dedicated link, or transmission path, that is routed separately from the link L interconnecting the telecommunications devices A and B. Receiving test parameters from the subscriber test controller 11 over the separate transmission path, the subscriber test execution unit 13 tests the target subscriber.

The subscriber test may cover the following diagnostic items: the functionality of the target subscriber terminal itself, the connectivity of a subscriber line between the target subscriber and its corresponding telecommunications device, the operation of a subscriber interface circuit in the telecommunications device, etc.

Figure 2:
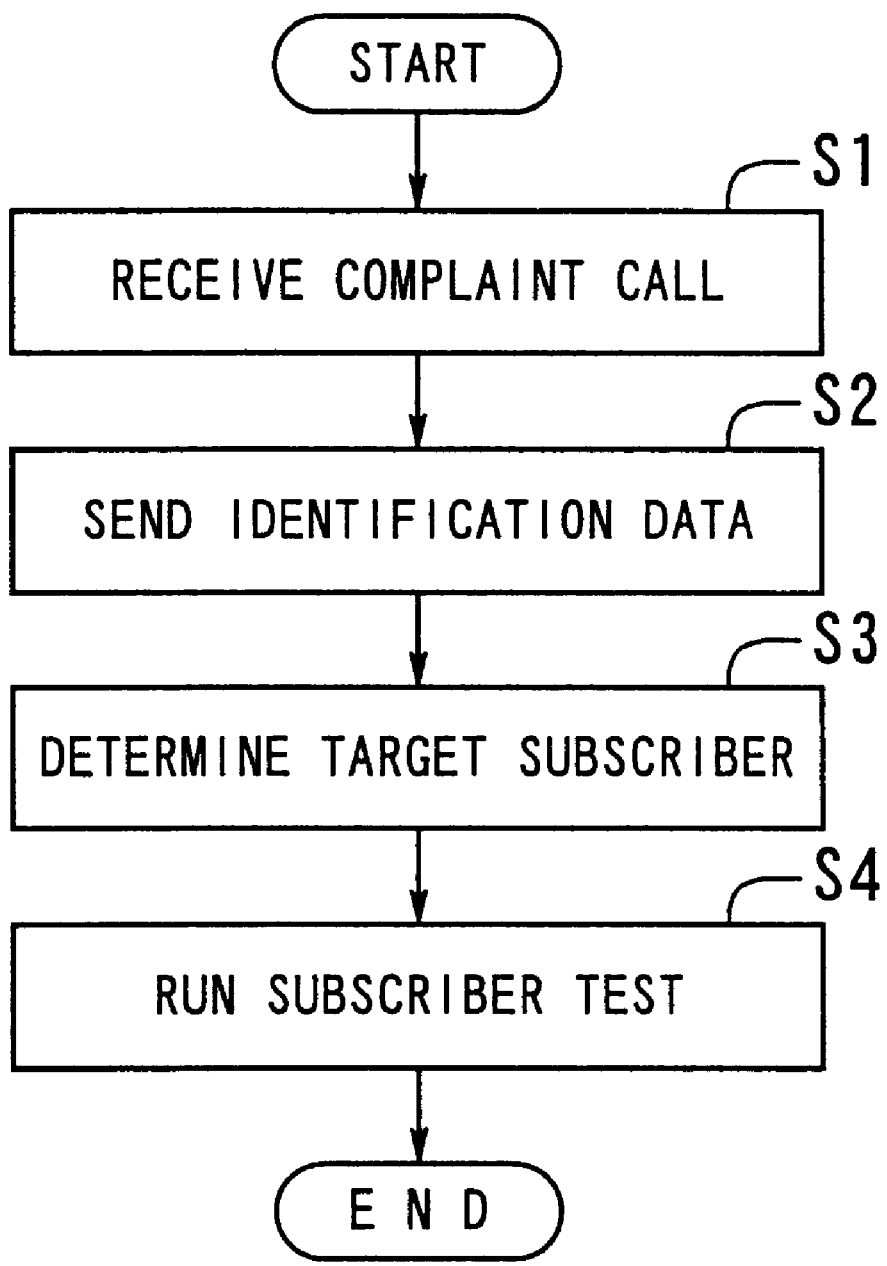
FIG. 2 is a flowchart which shows the operation sequence of the proposed subscriber test apparatus.

The operation of the proposed subscriber test apparatus 10 will now be described below. FIG. 2 is a flowchart which shows how this apparatus 10 behaves. It is assumed here that a problem occurred during a communication session between remote subscriber terminals SUa-a and SUb-a, which are served by the devices A and B, respectively. Suppose that the maintenance person M is now attempting a diagnostic test for the subscriber terminal SUb-a in response to a complaint call received from the subscriber terminal SUa-a.

(S1) Receiving a complaint call from the subscriber terminal SUa-a, the subscriber test controller 11 obtains the phone number of the subscriber terminal SUb-a in question.

(S2) Based on the obtained phone number, the subscriber test controller 11 retrieves first subscriber data relevant to the subscriber terminal SUb-a in question. The retrieved data, which is what was mentioned earlier as the identification data, is then sent to the subscriber data controller 12.

(S3) The target subscriber determination unit 12b receives the first subscriber data retrieved and sent by the subscriber test controller 11. It then consults the subscriber data cross-reference table T, which is maintained in the subscriber data management unit 12a, to determine the target subscriber.

(S4) The subscriber test execution unit 13 receives test parameters from the subscriber test controller 11 through a dedicated transmission path, which is disposed separately from the link L interconnecting the telecommunications devices A and B. According to the received test parameters, the subscriber test execution unit 13 tests the target subscriber determined in step S3.

The above step S2 may be modified such that the subscriber test controller 11 solely sends the phone number, instead of sending the whole first subscriber data as identification data. This alternative system configuration will be discussed with reference to FIG. 6 as a modified embodiment of the present invention.

The subscriber test controller 11 may be requested to test a subscriber terminal belonging to the first subscriber group SUa. If this is the case, the subscriber test controller 11 sends a command directly to the telecommunications device A to initiate a subscriber test.

As described above, the proposed subscriber test apparatus 10 is designed to centrally manage the subscriber data, employ a subscriber data controller 12 to determine a target subscriber to be tested, and run a subscriber test through a dedicated transmission path routed separately from the link L between the devices A and B. This system configuration improves the efficiency in conducting a test for subscribers SUa and SUb being served by such telecommunications devices A and B that are connected by an interface link L having no standard test specifications, because the maintenance person can make it all through a single subscriber test station (or subscriber test controller 11). It also enables the subscriber data to be updated and managed in a more efficient way.

The next section will provide a more specific implementation of the proposed subscriber test apparatus 10 in such a telecommunication system where a V5 interface is used to interconnect a local exchange and subscriber terminals.

Figure 3:
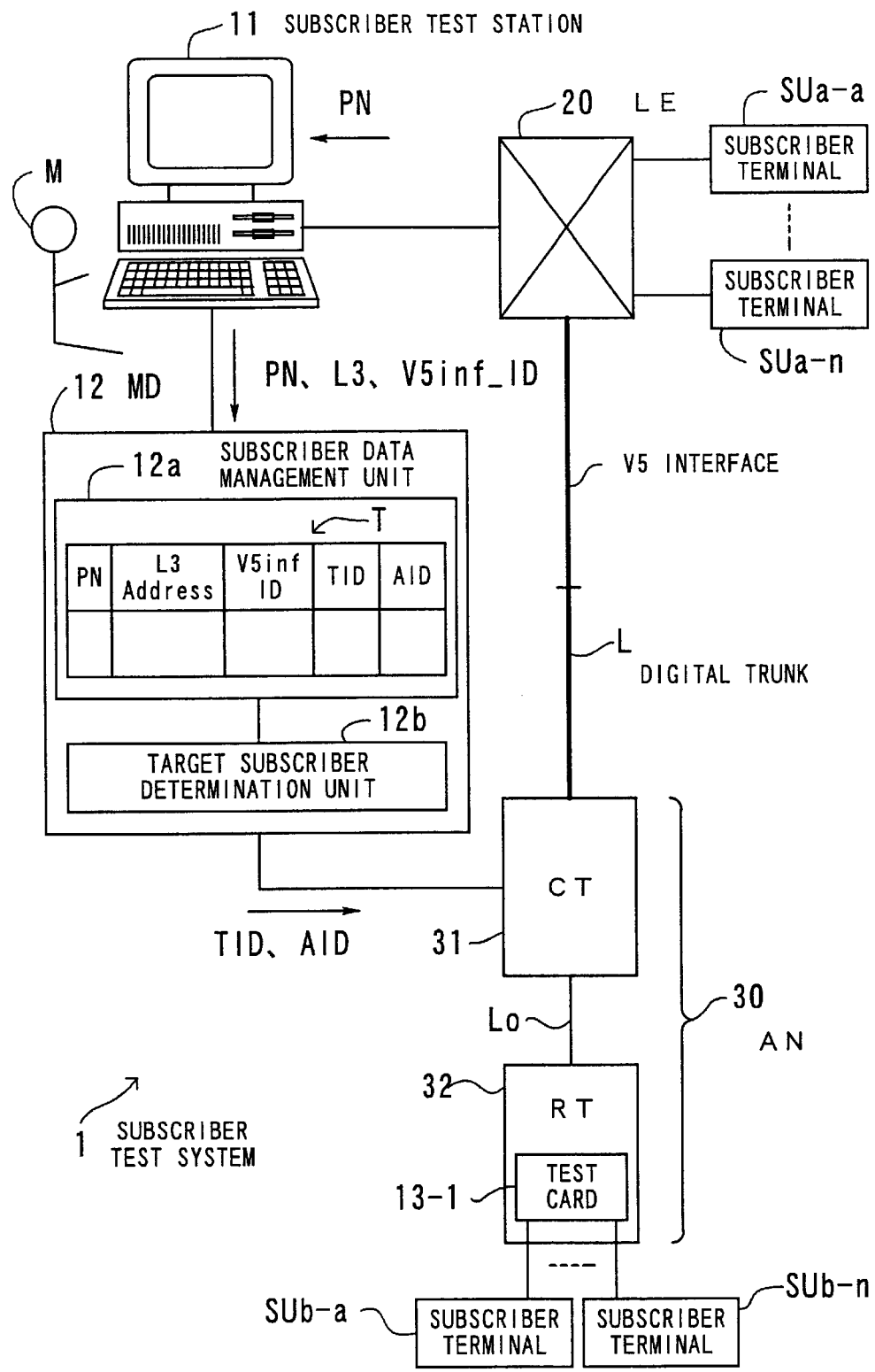
FIG. 3 is a diagram showing the structure of a system in which the proposed subscriber test apparatus is implemented.

FIG. 3 is a block diagram of a subscriber test system 1. This system 1 is configured to run a subscriber test to verify the connectivity of subscriber terminals served by a local exchange (LE) 20 and an access network (AN) 30, which are interconnected by a V5 interface link L. The local exchange 20 is coupled to a subscriber test station 11, as well as to a plurality of subscriber terminals SUa-a to SUa-n. A 2.048 Mbps digital trunk L complying with the V5 interface standards interconnects this local exchange 20 and a central terminal 31 in the access network 30.

A mediation device (MD) 12 is interposed between the subscriber test station 11 and central terminal 31. The central terminal 31 is linked to a remote terminal (RT) 32, another constituent of the access network 30, via a fiber optic cable Lo. The remote terminal 32, comprising a test card 13-1, serves a plurality of subscriber terminals SUb-a to SUb-n. The mediation device 12 comprises a subscriber data management unit 12a and target subscriber determination unit 12b. The subscriber data management unit 12a has a subscriber data cross-reference table T.

Note here that several elements have been renamed, compared with those in FIG. 1. That is, the subscriber test station 11 in FIG. 3 is what was explained as the subscriber test controller in FIG. 1. The mediation device 12 is what is called the subscriber data controller 12 in FIG. 1. The test card 13-1 is an implementation of the subscriber test execution unit 13. This single test card 13-1 supports testing of a plurality of subscriber terminals SUb-a to SUb-n.

FIG. 4 shows an example of the subscriber data cross-reference table T. Each entry of this table T has five data fields to hold the following subscriber-specific information: phone number 121, L3 address 122, V5 interface ID 123, TID 124, and AID 125. Phone number (PN) 121 is the phone number of a subscriber terminal. L3 address 122 is the network address assigned to each subscriber terminal, where L3 stands for Layer 3. V5 interface ID 123 is the identifier assigned to each network element (NE).

The V5 interface specifications do not allow duplicated IDs within a single network. Suppose, for instance, that one network element NEa serves 300 subscriber terminals and another network element NEb serves 200 subscriber terminals. In this system, the network element NEa may have a V5 interface ID of "h'FFFFF9," for example, and its local subscriber terminals are assigned L3 addresses ranging from 0 to 299. Likewise, the other network element NEb has a V5 interface ID of "h' FFFFF8" and its local subscriber terminals are assigned L3 addresses ranging from 0 to 199. In this way, the system allows a plurality of subscribers to share the same L3 addresses, but they can be uniquely distinguished from each other by taking their V5 interface IDs into consideration.

Referring again to FIG. 4, TID 124 is the identifier of a remote terminal relevant to each subscriber terminal. AID 125 is a slot ID assigned to each individual subscriber, which indicates the endpoint of a subscriber circuit within a subscriber line card (SLC). This AID is used in a subscriber test as a key identifier to locate the physical interface to which the target subscriber terminal is directly connected. SLCs are part of the remote terminal 32, which control the interface with the subscriber terminals.

The phone numbers 121, L3 addresses 122, and V5 interface IDs 123 are what has been collectively called the first subscriber data, which is stored in a database of the local exchange 20. On the other hand, the L3 addresses 122, V5 interface IDs 123, TIDs 124, and AIDs 125 are the second subscriber data stored in a database of the access network 30. Note that the TIDs 124 and AIDs 125 are vendor specific identifiers.

Figure 5:
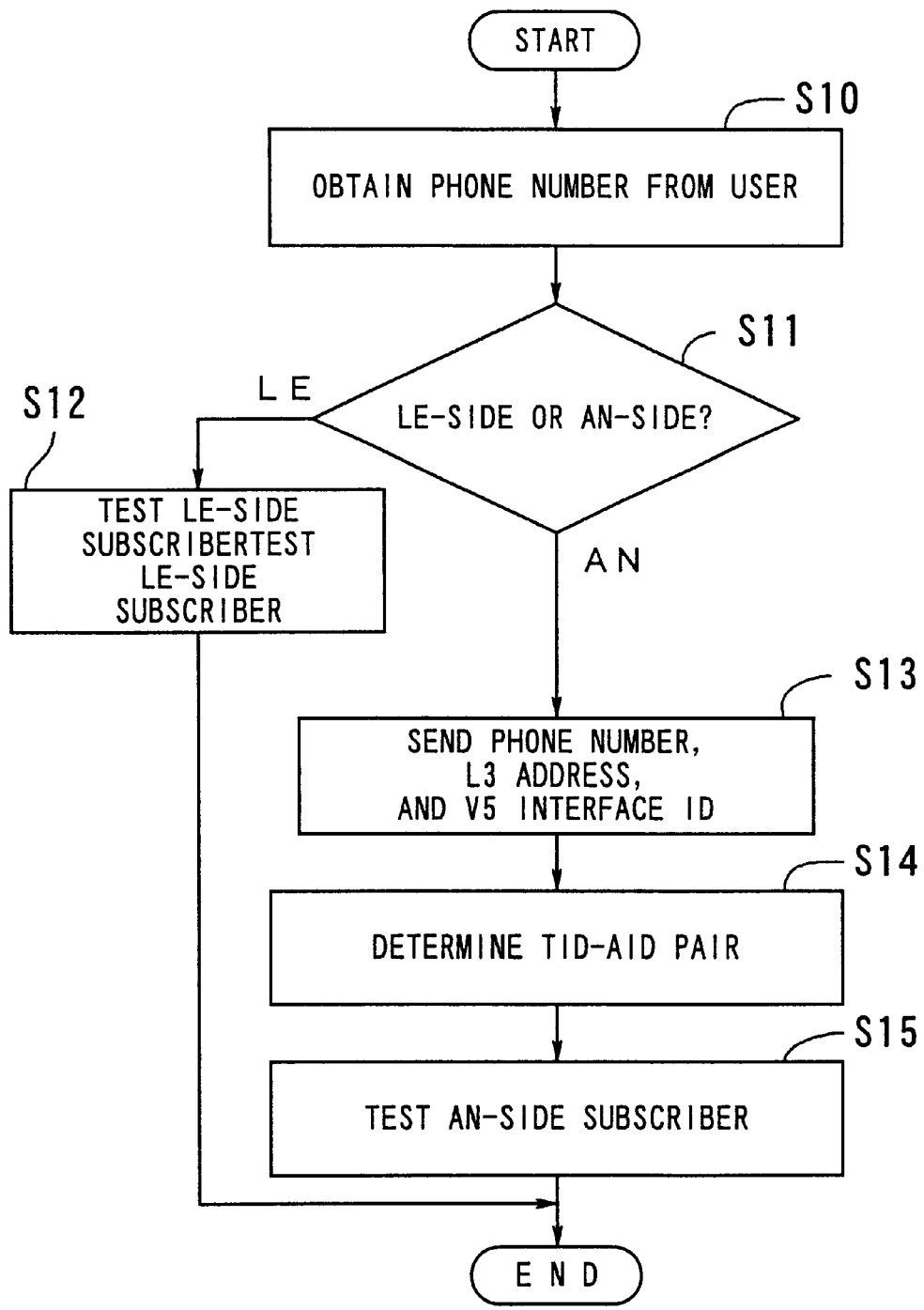
FIG. 5 is a flowchart which shows the operation of a subscriber test system.

The operation of the subscriber test system 1 will now be described below, with reference to a flowchart of FIG. 5. It is assumed here that a problem is encountered during a communication session between remote subscriber terminals SUa-a and SUb-a, which are served by the local exchange 20 and access network 30, respectively. A maintenance person M in the operations room receives a complaint call from the user of the subscriber terminal SUa-a. A special call number is available for such customer service purposes.

(S10) Talking to the user of the subscriber terminal SUa-a, the maintenance person M is requested to check a specific subscriber terminal in question. He/she receives from the user the phone number of the target subscriber to be tested.

(S11) The maintenance person M operates the subscriber test station 11 to make access to the database in the local exchange 20 to search for an entry relevant to the given phone number. From this entry, the subscriber test station 11 determines whether the target subscriber having that phone number is served by the local exchange 20 or the access network 30.

More specifically, the target subscriber is considered to be local to the local exchange 20 if the V5 interface ID relevant to the given phone number is the identifier of the local exchange 20. If the V5 interface ID is the identifier of the access network 30, the target subscriber is considered to be local to the access network 30. The process branches to step S12 in the former case, and step S13 in the latter case.

(S12) To conduct a subscriber test, the subscriber test station 11 sends necessary test parameters to the target subscriber, which is served by the local exchange 20 and has the specified phone number.

(S13) The subscriber test station 11 retrieves the latest L3 address and V5 interface ID associated with the given phone number, and sends them to the mediation device 12 as identification data of the target subscriber.

(S14) In the mediation device 12, the target subscriber determination unit 12b consults its subscriber data cross-reference table T to translate the received combination of a phone number, L3 address, and V5 interface ID into a particular set of TID and AID, thereby locating the target subscriber.

(S15) The test card 13-1 receives test parameters from the subscriber test station 11 via a transmission path other than the link L, and conducts the subscriber test for the target subscriber having the TID-AID pair obtained in step S14.

The subscriber data management unit 12a repetitively reads out the second subscriber data (i.e., L3 addresses, V5 interface Ids, TIDs, and AIDs), making access to a database in the access network 30. The frequency of this readout may be once per 24 hours, for example. Alternatively, the access network 30 can be configured to send the information voluntarily to the subscriber data management unit 12a. The subscriber test station 11, on the other hand, reads out the first subscriber data (phone numbers, L3 addresses, and V5 interface ID ) from the local exchange 20 each time a subscriber test is conducted, and sends it to the subscriber data management unit 12a. The subscriber data management unit 12a formulates a subscriber data cross-reference table T from the received information, composing each entry by finding common components of the first and second subscriber data. Accordingly, the latest subscriber data will always be ready for use, permitting the target subscriber determination unit 12b to locate the target subscriber, based on the subscriber data cross-reference table T.

Figure 6:
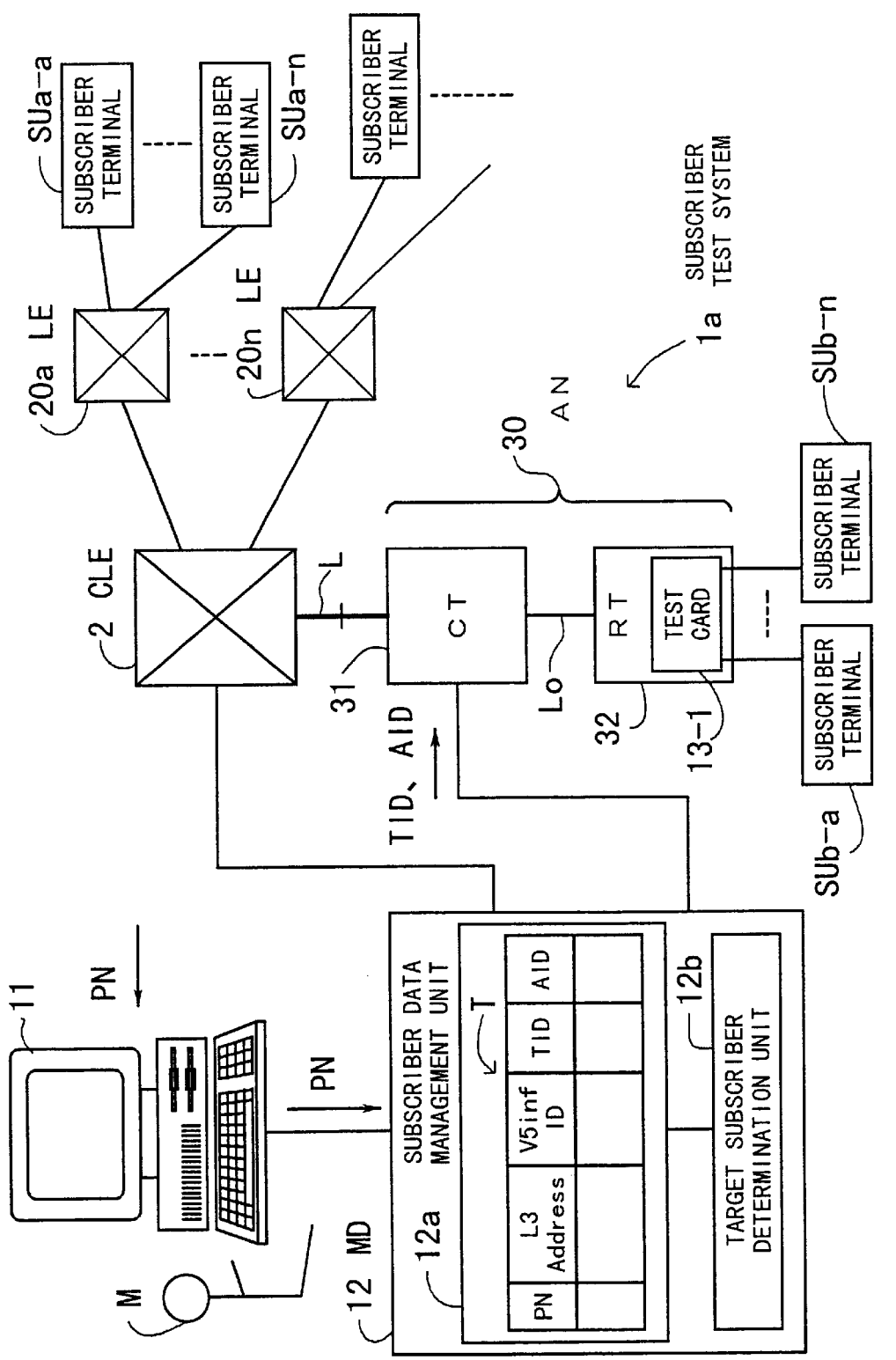
FIG. 6 is a diagram which shows a variant of the subscriber test system.

The next section will introduce a modified version of the subscriber test system 1, with reference to a block diagram of FIG. 6. This modified subscriber test system 1a is designed to run a subscriber test for the connectivity of subscriber terminals connected to a central local exchange (CLE) 2 and access network (AN) 30, which are interconnected by a V5 interface link L.

The central local exchange 2 is an upper-level exchange to which a plurality of local exchanges 20a to 20n are connected. A multiplicity of subscriber terminals, SUa-a to SUa-n and so on, are served by those lower-level local exchanges 20a to 20n. The central local exchange 2 is further connected to a central terminal (CT) 31 in the access network (AN) 30 via a 2.048 Mbps digital trunk L complying with the V5 interface standards.

A subscriber test station 11 is linked solely with a mediation device (MD) 12. The medication device 12 has two more links reaching the central local exchange 2 and central terminal 31. The central terminal 31 is linked to a remote terminal (RT) 32, another component of the access network 30, via a fiber optic cable Lo. The remote terminal 32 serving a plurality of subscriber terminals SUb-a to SUb-n has a test card 13-1. The mediation device 12 comprises a subscriber data management unit 12a and target subscriber determination unit 12b. The subscriber data management unit 12a has a subscriber data cross-reference table T. The central local exchange 2 uses its local database to centrally manage the information on the subscribers served by the lower-level local exchanges 20a to 20n.

Having a direct link to the central local exchange 2, the mediation device 12 can read out the first subscriber data periodically from there, including phone numbers, L3 addresses, and V5 interface IDs. Alternatively, the central local exchange 2 may be configured to periodically upload the same to the mediation device 12.

Figure 7:
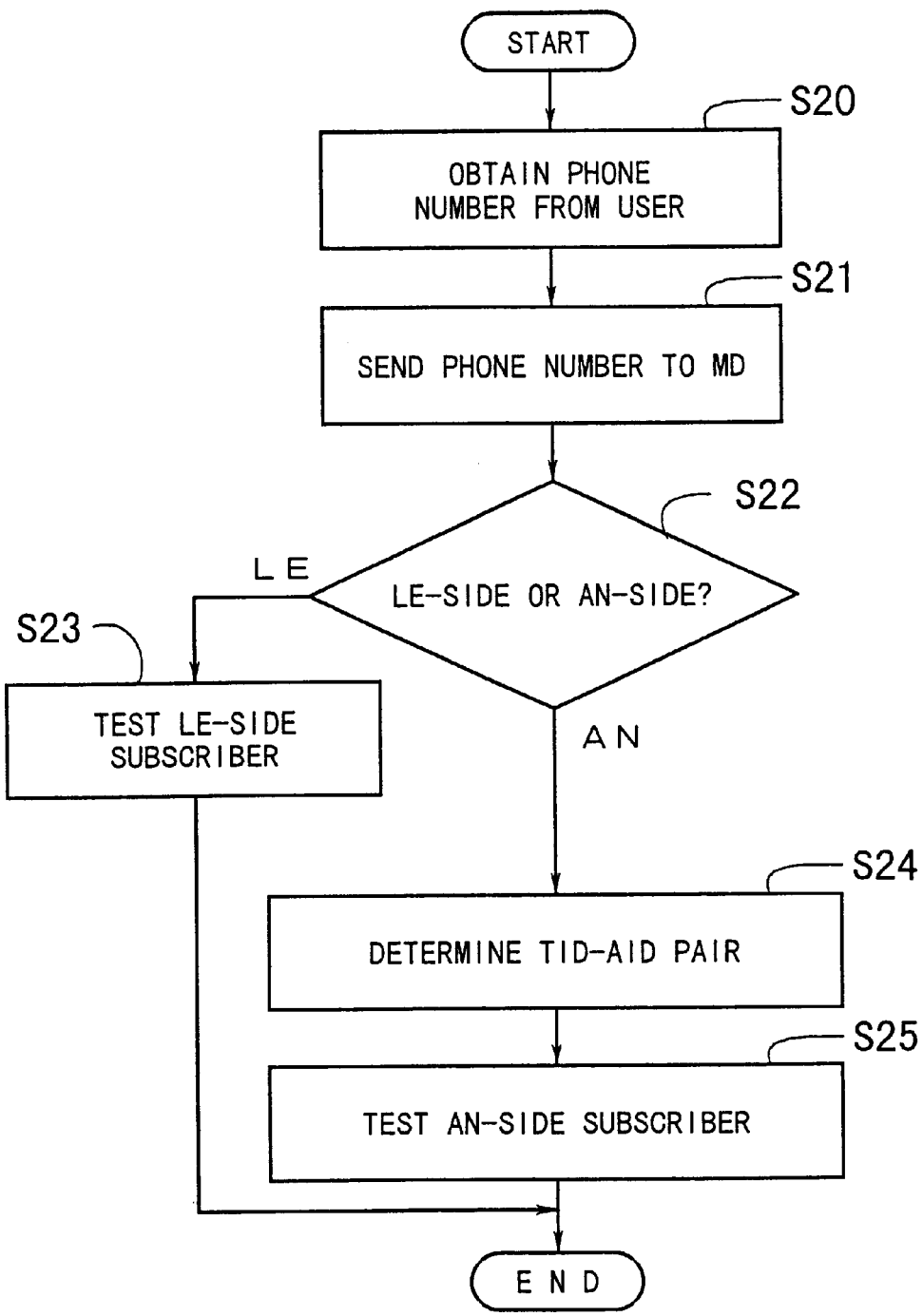
FIG. 7 is a flowchart which shows the operation of the proposed subscriber test system.

The operation of this subscriber test system 1a will now be described below, with reference to a flowchart of FIG. 7. It is assumed here that a problem occurred during a communication session between remote subscriber terminals SUa-a and SUb-a, which are served by the central local exchange 2 and access network 30, respectively. Suppose that a maintenance person M has received a complaint call from the user of the subscriber terminal SUa-a.

(S20) Talking to the user of the subscriber terminal SUa-a, the maintenance person M is requested to check a specific subscriber terminal. He/she receives from the user the phone number of the target subscriber to be tested.

(S21) The subscriber test station 11 sends the given phone number to the mediation device 12 as identification data of the target subscriber.

(S22) The subscriber test station 11 makes access to the database in the central local exchange 2 to search for a record relevant to the given phone number. From the retrieved record, it determines whether the target subscriber is served by the central local exchange 2 or by the access network 30. The process branches to step S23 in the former case, and step S24 in the latter case.

(S23) To conduct a subscriber test, the subscriber test station 11 sends test parameters to the target subscriber, which is served by the central local exchange 2 and has the specified phone number.

(S24) In the mediation device 12, the target subscriber determination unit 12b consults its subscriber data cross-reference table T to translate the received phone number into a particular pair of TID and AID, thereby locating the target subscriber. Note that the mediation device 12 can identify the target subscriber solely with the received phone number, since it has already received the first subscriber data from the central local exchange 2. The second subscriber data is supplied from the central terminal 31 as in the system of FIG. 3.

(S25) The test card 13-1 receives test parameters from the subscriber test station 11 via a transmission path other than the link L, and runs a subscriber test for the target subscriber having the TID-AID pair obtained in step S24.

In contrast to the original subscriber test system 1 described earlier, the above modified subscriber test system 1a only requires the subscriber test station 11 to provide a phone number to identify the target subscriber to be tested. This simplifies the communication control functions implemented in the subscriber test station 11, thus making it possible to run a subscriber test more efficiently.

Figure 8:
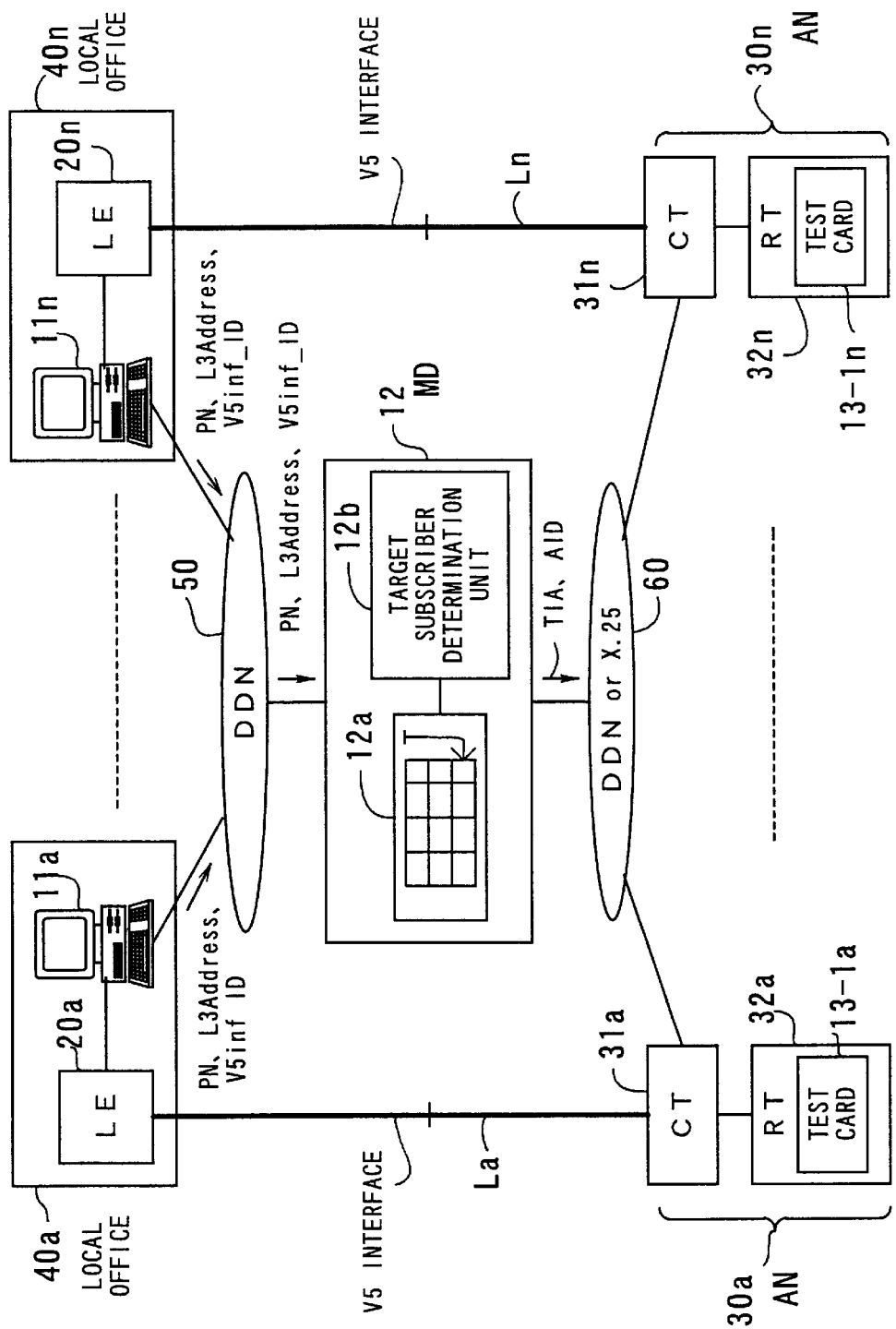
FIG. 8 is a diagram which shows a network system including the proposed subscriber test system.

The next section will now present a typical network system employing the subscriber test system 1, with reference to a block diagram of FIG. 8.

The illustrated system involves a plurality of local offices 40a to 40n, accommodating their own local exchanges (LEs) 20a to 20n, as well as subscriber test stations 11a to 11n coupled thereto, respectively. The subscriber test stations 11a to 11n are connected to a digital data network (DDN) 50, as is a mediation device (MD) 12. The mediation device 12 comprises a subscriber data management unit 12a and target subscriber determination unit 12b. The subscriber data management unit 12a has a subscriber data cross-reference table T. The mediation device 12 is connected to another digital data network (DDN) 60, which may alternatively be a packet switching network according to the X.25 recommendation.

A plurality of central terminals (CTs) 31a to 31n are linked with corresponding remote terminals (RTs) 32a to 32n, constituting access networks (ANs) 30a to 30n. The central terminals 31a to 31n are connected to the digital data network 60. Further, the access networks 30a to 30n communicate with their corresponding local exchanges 20a to 20n via V5 trunk interfaces La to Ln, respectively.

The above-described system 1 allows the subscriber test stations 11a to 11n in the local offices 40a to 40n to perform a subscriber test for a specific subscriber terminal (not shown in FIG. 8) being served by either one of the access networks 30a to 30n. Identification data, including a specific phone number, L3 address, and V5 interface ID, is transported either from local office 40a to 40n to the mediation device 12 over the first digital data network 50. The data is translated in the mediation device 12 to identify the TID and AID of the target subscriber. For details of the operation, refer to FIG. 5 and related parts of the description.

Figure 9:
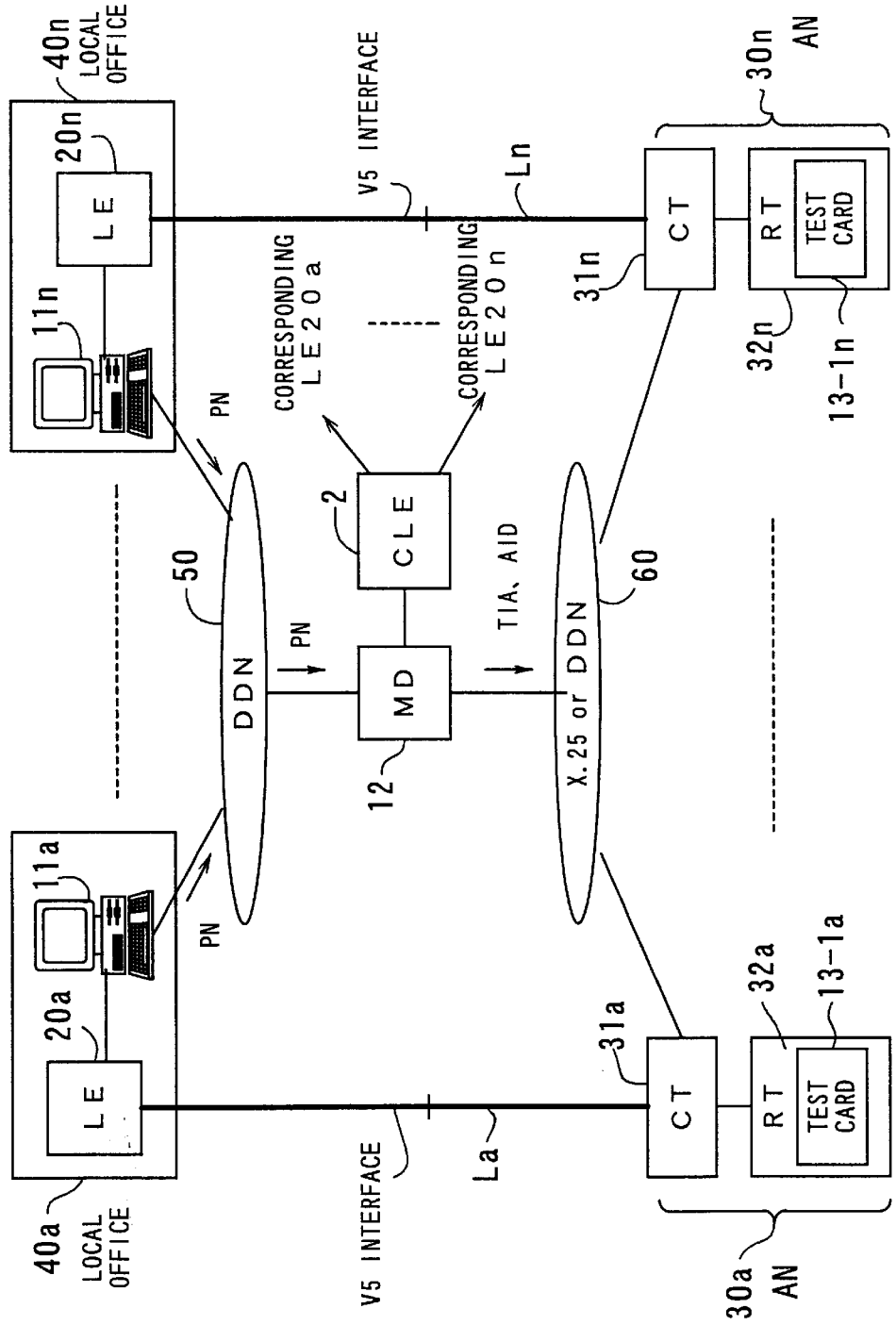
FIG. 9 is a diagram which shows a network system including the modified subscriber test system.

The next section will present a typical network system employing the modified subscriber test system 1a, with reference to a block diagram of FIG. 9.

The illustrated system involves a plurality of local offices 40a to 40n, which comprise local exchanges (LEs) 20a to 20n and subscriber test stations 11a to 11n coupled thereto, respectively. The subscriber test stations 11a to 11n are connected to a digital data network (DDN) 50, as is a mediation device (MD) 12.

The mediation device 12 comprises a subscriber data management unit 12a and target subscriber determination unit 12b (both not shown). The subscriber data management unit 12a comprises a subscriber data cross-reference table T (not shown). The mediation device 12 is connected to another digital data network (DDN) 60, which may alternatively be a packet switching network according to the X.25 recommendation. The mediation device 12 has one more link to reach a central local exchange (CLE) 2 which is connected to the local exchanges 20a to 20n.

A plurality of central terminals (CTs) 31a to 31n are linked with corresponding remote terminals (RTs) 32a to 32n, constituting access networks (ANs) 30a to 30n. Those central terminals 31a to 31n are connected to the digital data network 60. Further, the access networks 30a to 30n communicate with their corresponding local exchanges 20a to 20n via V5 trunk interfaces La to Ln, respectively.

The above-described system allows the subscriber test stations 11a to 11n in the local offices 40a to 40n to perform a subscriber test for a specific subscriber terminal (not shown in FIG. 9) being served by either one of the access networks 30a to 30n. Identification data, including a specific phone number only, is transported from either local office 40a to 40n to the mediation device 12 over the first digital data network 50. The data is translated in the mediation device 12 to identify the TID and the AID of the target subscriber. For details of the operation, refer to FIG. 7 and related parts if the description.

Figure 10:
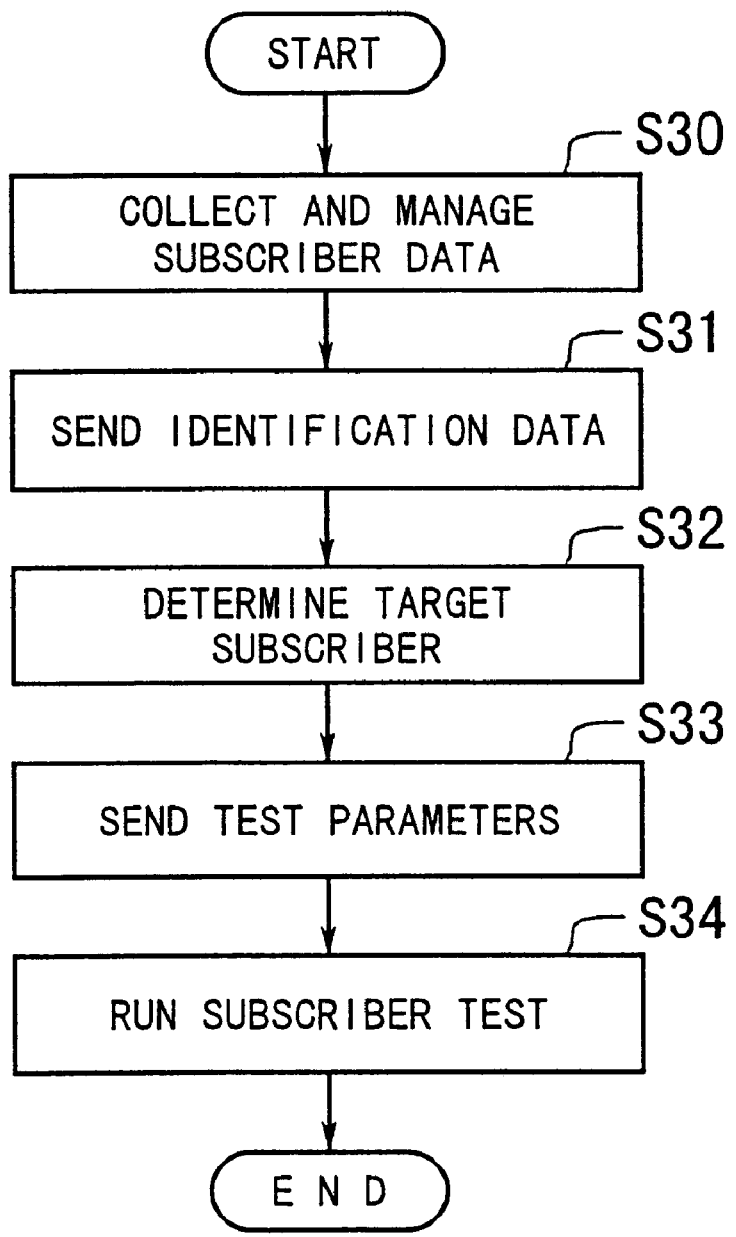
FIG. 10 is a flowchart which explains a subscriber test method according to the present invention.
Figure 11:
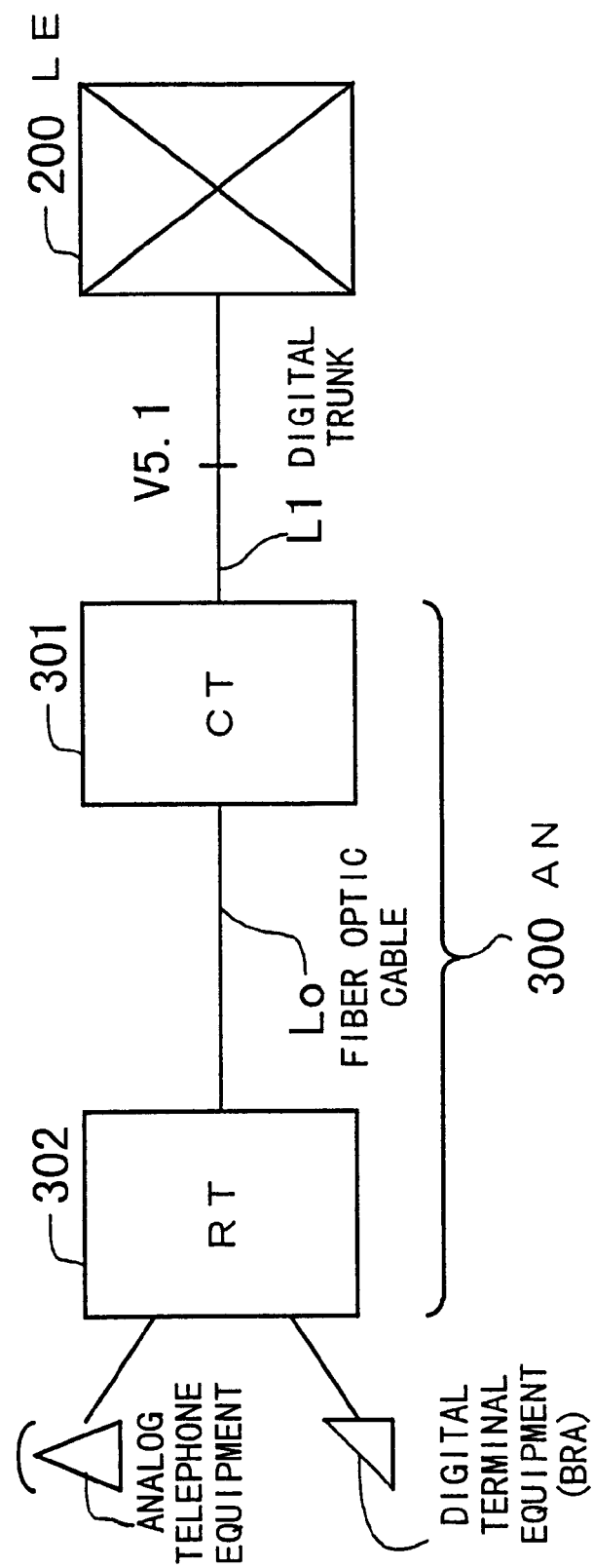
FIG. 11 is a diagram which schematically shows a system model using a V5.1 interface.
Figure 12:
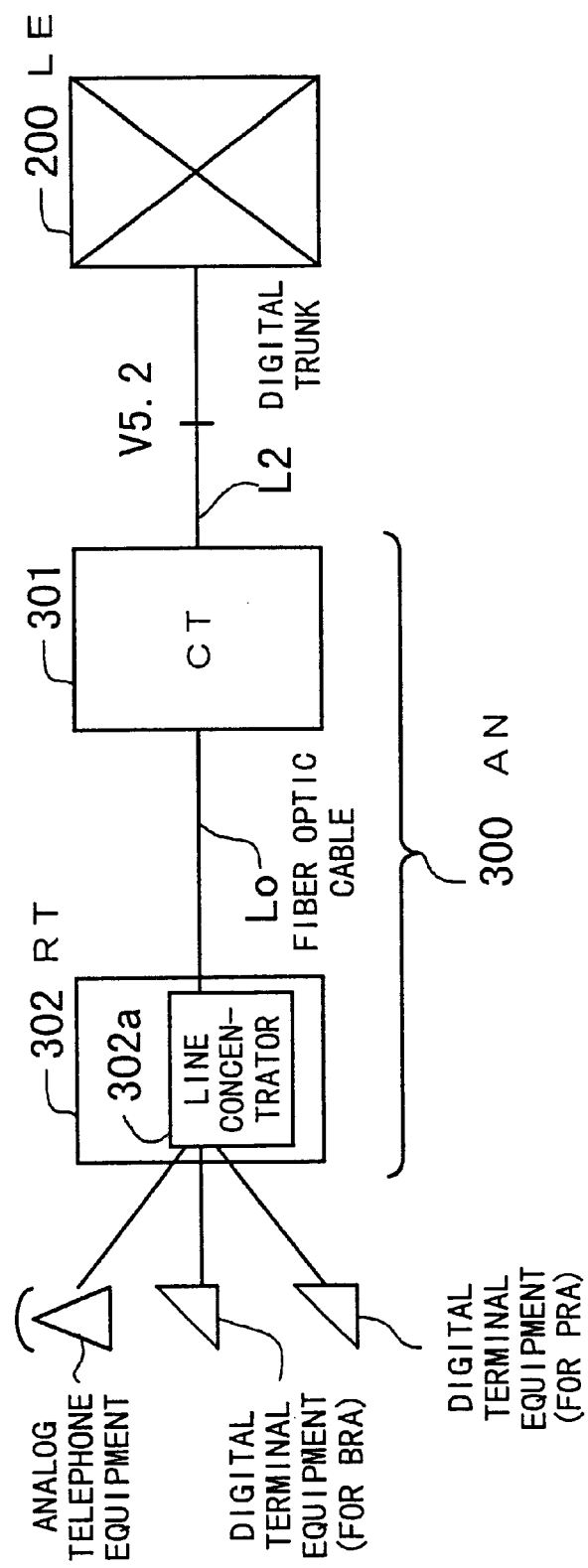
FIG. 12 is a diagram which schematically shows a system model using a V5.2 interface.
Figure 13:
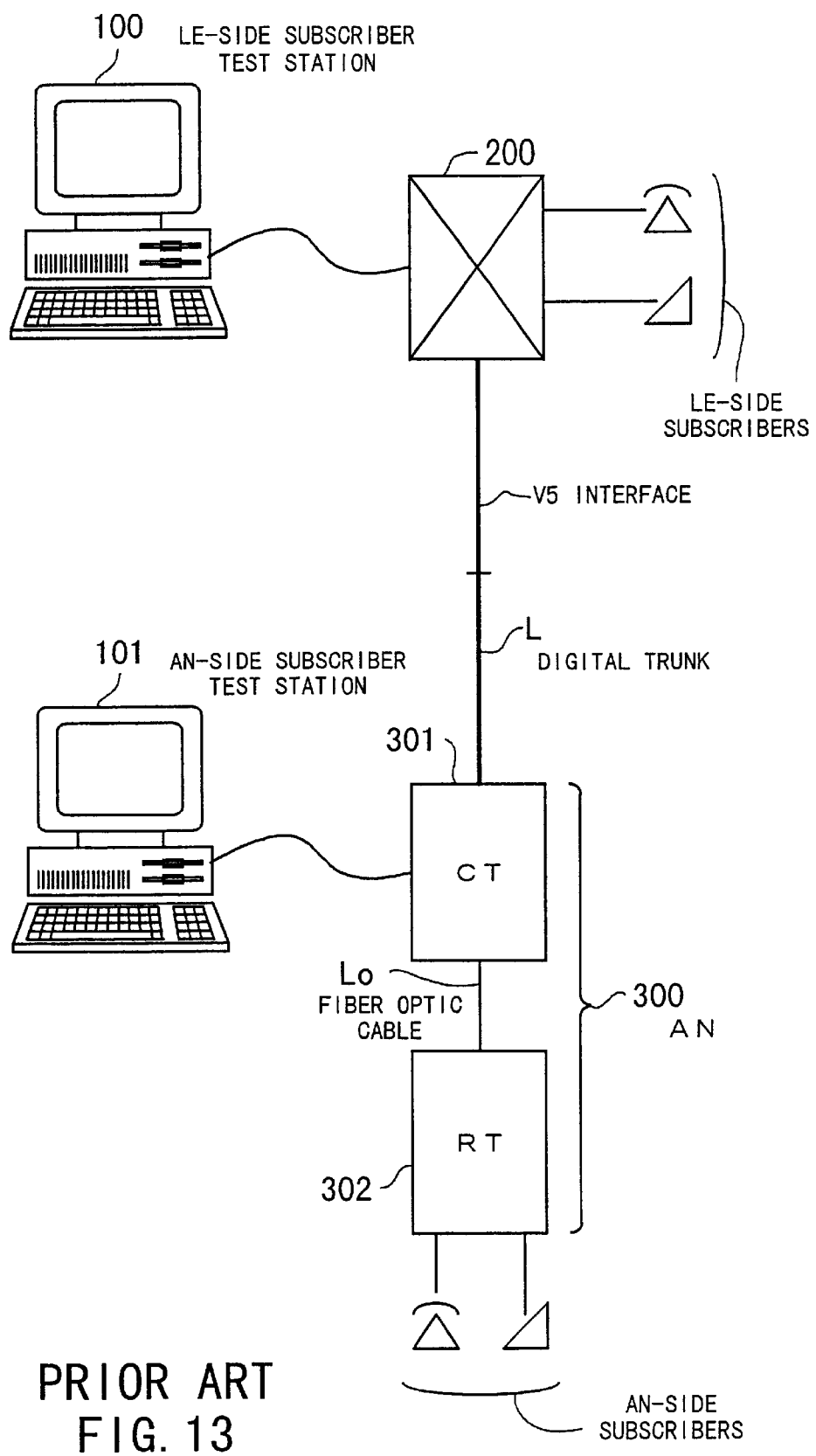
FIG. 13 is a diagram which schematically shows a configuration of a conventional subscriber test system for a telecommunications network using V5 interface.

Referring lastly to FIG. 10, the following section will describe a subscriber test method according to the present invention. The present invention provides a subscriber test method applicable to such subscribers that are served by telecommunication equipment linked by an interface.

FIG. 10 is a flowchart which explains the subscriber test method according to the present invention, which comprises the following steps:

(S30) Collecting subscriber data concerning subscribers and managing the collected data in a centralized manner.

(S31) Sending identification data that will be used to identify a target subscriber to be tested.

(S32) Identifying the target subscriber by using the identification data in searching the subscriber data.

(S33) Sending test parameters for the intended subscriber test over a transmission path that is routed separately from the interface link.

(S34) Running a subscriber test for the target subscriber identified, according to the test parameters.

In this way, the proposed subscriber test method are configured to centrally manage the subscriber data, determine a target subscriber, and run a subscriber test through a transmission path that is routed separately from the trunk interconnecting telecommunication equipment. This method promises improved efficiency in conducting a test for subscriber lines and terminals, even though they are served by such telecommunications devices that are connected by a trunk interface providing no standard test protocols. The maintenance person can conduct a test all through a single subscriber test station. The method also enables the subscriber data to be updated and managed in a more efficient way.

For illustrative purposes, it has been assumed so far that local exchanges and access networks are interconnected by telecommunications links complying with the V5 interface standards. The present invention, however, is not restricted to this specific interface specifications, but also applicable to any other like interfaces.

The above discussion will now be summarized as follows. According to the present invention, the proposed subscriber test apparatus is designed to centrally manage the subscriber data, employ a subscriber data controller to determine a target subscriber, and run a subscriber test by using a dedicated link that is disposed separately from the link between telecommunications devices. The proposed system configuration improves the efficiency in conducting a test for subscriber lines and terminals. This is because maintenance people can make it all through a single subscriber test station, even if the subscriber terminals are served by such telecommunications devices that are connected by a trunk interface providing for no standard test specifications.

The present invention also provide a subscriber test method which comprises the steps of: centrally managing the subscriber data, determining a target subscriber to be tested, and running a subscriber test through a transmission path that is disposed separately from trunk interfaces interconnecting telecommunication equipment. This method enables maintenance people to perform a subscriber test more efficiently, since they can make it all with a single subscriber test station, even in such an environment where telecommunications devices serving their local subscriber terminals are connected by trunk interfaces providing for no standard test protocols.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for testing subscriber terminals connected to an access network device in a telecommunications system where a local exchange is connected to the access network device via a first link, the apparatus comprising:

(a) subscriber test control means for controlling a process of a subscriber test by sending related test parameters and identification data to be used to identify a target subscriber terminal to be tested;

(b) subscriber data control means, coupled to said subscriber test means, local exchange and access network device for controlling data concerning the subscriber terminals, comprising:

(b1) subscriber data management means for collecting subscriber data about the subscriber terminals connected to the access network device and centrally managing the collected subscriber data in a subscriber data cross-reference table, and (b2) target subscriber determination means, coupled to said subscriber test control means and subscriber data management means and responsive to the identification data sent from said subscriber test control means, for identifying the target subscriber terminal by using the received identification data in searching the subscriber data cross-reference table being managed by said subscriber data management means;

(c) subscriber test execution means, disposed in the access network device, for receiving the test parameters from said subscriber data control means and running the subscriber test according to the received test parameters; and (d) a second link conveying the test parameters from said subscriber data control means to said subscriber test execution means in the access network device, said second link being physically separate from the first link;

wherein:

the subscriber data is divided into first data items residing only in the local exchange, second data items residing only in the access network device, and third data items residing in both the local exchange and access network device, the subscriber data cross-reference table associates the first data items with the second data items by using the third data items as common key information thereof, said subscriber data management means collects the second data items from the access network device through said second link, and the second data items include slot identifiers of individual subscriber line cards (SLCs) that are installed in the access network device to interface with the subscriber terminals.

2. The apparatus according to claim 1, wherein said subscriber data management means updates the subscriber data stored in the subscriber data cross-reference table, automatically maintaining consistency among data items within the subscriber data, when either of the first and second subscriber data is changed.

3. The apparatus according to claim 1, wherein:

said subscriber test control means is coupled to the local exchange or to the access network device;

when coupled to the local exchange, said subscriber test control means sends to said subscriber data control means the first subscriber data as the identification data; and when coupled to the access network device, said subscriber test control means sends to said subscriber data control means the second subscriber data as the identification data.

4. The apparatus according to claim 1, wherein:

said subscriber data control means is connected to the local exchange; and said subscriber test control means sends to said subscriber data control means a phone number of the target subscriber terminal as the identification data.

5. A method of testing subscriber terminals connected to an access network device in a telecommunication system where a local exchange is connected to the access network device via a first link, the method comprising the steps of:

(a) collecting subscriber data about the subscriber terminals connected to the access network device, and formulating a subscriber data cross-reference table to centrally manage the collected subscriber data;

(b) sending identification information to identify a target subscriber terminal to be tested;

(c) identifying the target subscriber terminal by using the received identification data in searching the subscriber data cross-reference table;

(d) sending test parameters relating to the subscriber test to the access network device over a second link that is physically separate from the first link; and (e) in the access network device, running the subscriber test for the determined target subscriber terminal, according to the received parameters;

wherein:

the subscriber data is divided into first data items residing only in the local exchange, second data items residing only in the access network device, and third data items residing in both the local exchange and access network device, the subscriber data cross-reference table associates the first data items with the second data items by using the third data items as common key information thereof, said collecting step (a) collects the second data items from the access network device through said second link, and the second data items include slot identifiers of individual subscriber line cards (SLCs) that are installed in the access network device to interface with the subscriber terminals.

6. The method according to claim 5, wherein said sending step (b) comprises the substep of determining whether the target subscriber terminal is connected to the local exchange or to the access network device.

7. The apparatus according to claim 1, wherein the first link is a V5 interface.

8. The apparatus according to claim 7, wherein the access network device comprises a central terminal (CT) and remote terminals (RTs).

9. The apparatus according to claim 8, wherein said subscriber test execution means is disposed in one of said remote terminals.

* * * * *